Jan. 17, 1933.  D. R. DAVIES  1,894,816
ELECTRICAL SWITCH GEAR
Filed June 15, 1931
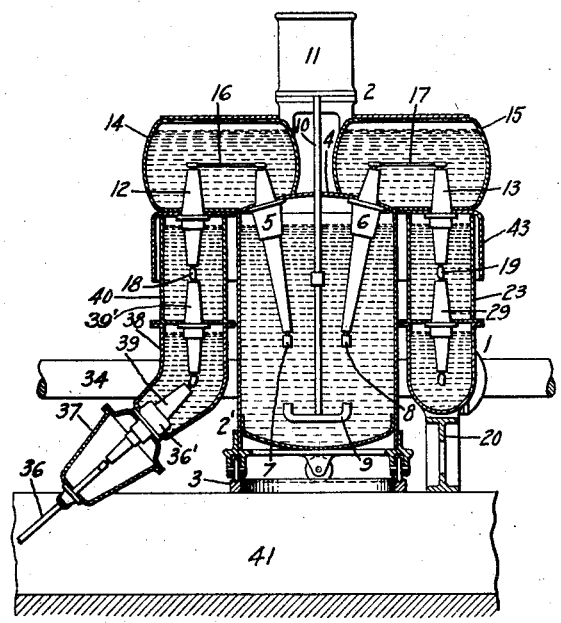
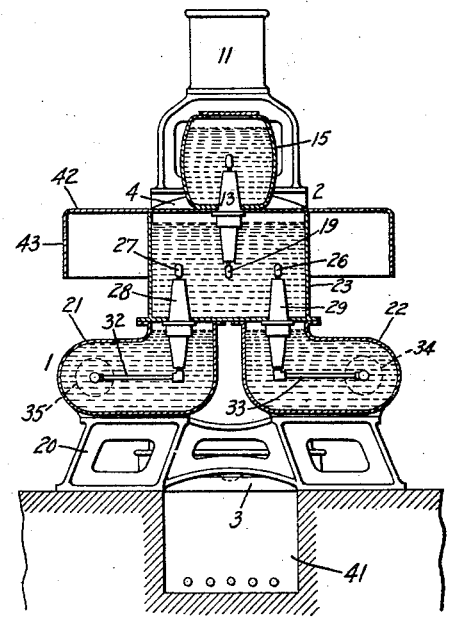
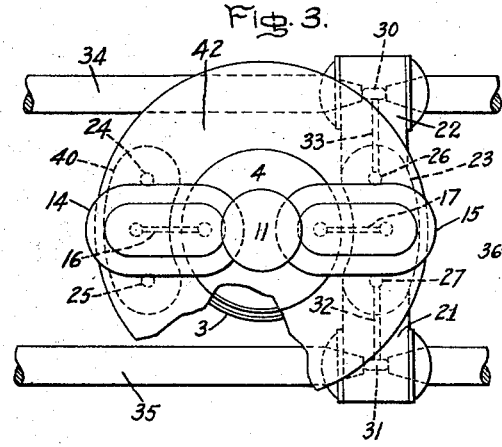
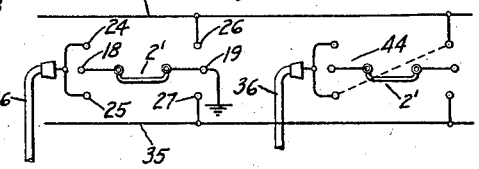
Inventor:
David R. Davies,
by Charles V. Tullar
His Attorney.

Patented Jan. 17, 1933

1,894,816

UNITED STATES PATENT OFFICE

DAVID REGINOLD DAVIES, OF DIDSBURY, ENGLAND, ASSIGNOR TO GENERAL ELECTRIC COMPANY, A CORPORATION OF NEW YORK

ELECTRICAL SWITCH GEAR

Application filed June 15, 1931, Serial No. 544,436, and in Great Britain July 25, 1930.

My invention relates to electrical switchgear, more particularly to electrical switchgear of the metal clad type including a circuit breaker and means for disconnecting or isolating the circuit breaker with respect to an associated circuit or circuits.

A principal object of my invention is the provision of improved switchgear of the aforesaid type arranged so that bodily movement of the circuit breaker is effective to cause engagement and disengagement of the disconnecting or isolating contacts relating the circuit breaker to an associated circuit or circuits.

In accordance with the present invention the movable portion of the switchgear including the circuit breaker is mounted for bodily rotative movement with respect to a vertical axis disposed, by way of example, intermediate a set of busbar and branch circuit or cable end connections, or intermediate alternate sets of busbars, as main and auxiliary busbars, and/or branch circuit connections, the circuit breaker being connected with or isolated from the busbars and branch circuit connections, or selectively connected to alternate sets of busbars and/or branch circuit connections, as the case may be, by rotative movement of the movable portion of the switchgear.

In a preferred arrangement the circuit breaker is mounted so as to rotate about its vertical axis, the movable disconnecting contacts each depending from radial conductors mounted on the cover of the circuit breaker tank and entering a compartment, preferably oil filled, in which the cooperating fixed contacts are disposed. A hood or cover member may likewise be mounted on the rotary portion of the switchgear so as effectively to close at all times during operation the compartments in which the disconnecting contacts are located.

In the event that alternate busbars are provided for selective connection to the circuit breaker and branch circuit or circuits, they may be conveniently arranged on opposite sides of the axis of rotation of the rotary portion of the switchgear and suitably connected by laterally extending conductors to fixed disconnecting contacts cooperating with one of the aforesaid movable disconnecting contacts. The fixed disconnecting contacts selectively cooperating with the other movable disconnecting contact may complete the connection to an incoming cable or branch circuit so that the circuit breaker connects said cable to one of said buses in one position and to the other of said buses in the alternate position, complete isolation of the circuit breaker being effected by rotating the same to an intermediate position. In this position one of the movable disconnecting contacts may be arranged to engage a fixed grounding contact so that the circuit breaker is both isolated and grounded.

In a polyphase arrangement the circuit breakers for the individual phases are preferably mounted in separate housings and are operated independently, suitable provision of course being made for insuring synchronous operation. Likewise, the synchronous operation may involve a suitable interlocking system so that the disconnecting or isolating operations must be preceded by tripping of the circuit breaker mechanism, as is well known in the art.

My invention will be more fully set forth in the following description referring to the accompanying drawing, and the features of novelty which characterize my invention will be pointed out with particularity in the claims annexed to and forming a part of this specification.

Referring to the drawing, Fig. 1 is an elevational view, partly in section, of electrical metal clad switchgear embodying my invention; Fig. 2 is an elevational end view, partly in section, of the switchgear shown in Fig. 1; Fig. 3 is a partial plan view of the switchgear illustrated in Fig. 1, and Fig. 4 is a diagram of circuit connections.

The metal clad switchgear illustrated by way of example in Fig. 1 comprises a stationary structure 1 including the busbar and branch circuit connections and a movable portion 2 including a circuit breaker and its associated mechanism 2', of the well known fluid-break or oil type. The movable portion 2 is mounted for bodily rotative movement on a horizontal turntable 3 or the like, the axis of rotation being the vertical axis of the circuit breaker.

The circuit breaker 2' comprises the conventional oil-filled tank 4 in the upper part of which are mounted the lead-in insulating bushings 5 and 6. Immersed in the oil and depending from the bushings 5 and 6 are the circuit breaker contacts 7 and 8 respectively for engagement in a well known manner with the movable bridging contact 9 which is operated through the lift rod 10 and operating mechanism mounted above the breaker and generally indicated at 11.

The disconnecting or isolating contacts connected to the circuit breaker terminals through the bushings 5 and 6 are connected to the lower terminals of the insulating bushings 12 and 13 extending through the lower walls of oil-filled casings 14 and 15, respectively, mounted on and overhanging the circuit breaker tank 4 as best illustrated in Fig. 1. The insulating bushings 5 and 6 likewise extend into the casings 14 and 15 respectively, the upper terminals of bushings 5 and 12 being suitably connected by a conductor 16, and corresponding terminals of bushings 6 and 13 being likewise connected by a conductor 17. The movable disconnecting contacts 18 and 19 are suitably mounted at the lower ends of the bushings 12 and 13 respectively and may be of any suitable type as of the well known plug and socket, laminated or brush, or knife blade and jaw types.

The stationary portion of the switchgear including the circuits to which the circuit breaker is related comprises laterally disposed tanks or casings forming compartments in which both the movable and stationary disconnecting contacts are immersed in an insulating liquid as oil. As best illustrated in Fig. 2, a supporting frame 20 has mounted thereon oil filled casings 21 and 22 in turn supporting an oil filled casing 23 in which the disconnecting contacts related to the breaker terminal bushing 6 are immersed in oil separate from that in the circuit breaker. The stationary disconnecting contacts 26 and 27 coact with the movable contact 19, and, referring to Fig. 4, the other disconnecting contact 18 is arranged to coact with similar stationary contacts 24 and 25.

Referring again to Fig. 2, the contacts 27 and 26 are mounted on insulating bushings 28 and 29 extending through the lower wall of the casing 23 and into the oil filled casings 21 and 22 respectively. As best illustrated in Figs. 2 and 3, the casings 22 and 21 form lateral extensions at the busbar junctions 30 and 31, the busbars being connected by conductors 33 and 32 to the contacts 26 and 27 respectively.

The alternate or main and auxiliary busbars, generally indicated at 34 and 35 respectively in Fig. 3, extend parallel with each other at opposite sides of the switchgear and are supported at intervals by similar supporting structures 20, the busbars being suitably armored or sheathed and insulated in a manner well known in the art.

The branch circuit or cable 36 is suitably connected to the stationary disconnecting contacts 24 and 25, as through a so-called cable end bell 37 through which and the oil-filled casing 38 an insulating bushing 39 extends, having branch connections to the disconnecting contacts as diagrammatically illustrated in Fig. 4. A current transformer 36' may be mounted on the bushing 39 adjacent the end bell 37. The branch connections for the stationary disconnecting contacts 24 and 25 comprise bushings as 39' on which the contacts are mounted extending into the oil-filled casing 40 in a manner similar to that illustrated in Fig. 2. The cable 36 together with other feeder cables, or the like, may extend parallel with the busbars within a cable trench 41 disposed centrally of and beneath the switchgear unit.

For the purpose of shielding the disconnecting contacts at all times, thereby preventing accidental contact therewith, and for protecting the insulating liquid from contamination by water and dust, there is provided a cover member or shield 42 comprising, in the present instance, a circular plate mounted on the circuit breaker tank 4 and fitting closely over the tops of the oil-filled casings 23 and 40 so that the movable part of the switchgear is free to rotate while at the same time maintaining the disconnecting contact compartments closed. The protective effect is further increased by a depending flange 43 extending closely along the sides of the stationary casings to be protected. The cover 42 is suitably provided with apertures through which the insulating bushings and circuit breaker tank cover extend.

The disconnecting or isolating operation is effected by suitable actuating means, as a motor, not shown, operatively connected to the rotatable portion 2 of the switchgear. Rotation of the circuit breaker on the turntable 3 causes transverse movement of the movable disconnecting contacts 18 and 19 with respect to the transversely positioned coacting contacts, the direction and extent of rotation determining the circuit connections. When the disconnecting contacts are in the positions illustrated in Fig. 2 and diagrammatically in the left-hand unit of Fig. 4, the switchgear is in the isolated and grounded position wherein the disconnecting contacts 18 and 19 are intermediate the coacting stationary disconnecting contacts and are insulated therefrom by oil. The grounding contact coacting with the disconnecting contact 19 is of course optional but is an additional safeguard in the event that the oil decreases in insulating value so that the isolated parts of the circuit breaker may still be at a dangerous potential.

Assuming now that the branch circuit or feeder cable 36 is to be connected to the main busbar 34 and that the circuit breaker 2' is open, the movable portion of the switchgear is rotated through a small angle in a counter-clockwise direction, as viewed in Fig. 4, so that the disconnecting contacts 18 and 19 engage the stationary disconnecting contacts 25 and 26 respectively, thereby connecting the cable 36, after closing of the circuit breaker 2', to the main busbar 34. This position is illustrated in dotted line in the similar right-hand unit 44 diagrammatically shown in Fig. 4, any number of units required for the bus and switch station being connected in the above manner to the main and auxiliary busbars.

When the feeder cable 36 is to be transferred from the main busbar 34 to the auxiliary busbar 35 the circuit breaker 2' is first tripped open and the movable portion 2 rotated clockwise until the disconnecting contacts 18 and 19 are in engagement with the stationary disconnecting contacts 24 and 27 respectively, thereby connecting the cable 36 directly to the auxiliary busbar 35 upon closing of the circuit breaker 2'. As previously stated, suitable interlocking mechanism is provided for insuring making and breaking of the circuit by the circuit breaker 2', and not at the disconnecting contacts, which is in accordance with well known practice.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Electrical switchgear comprising a circuit breaker having relatively movable contacts mounted for bodily rotative movement about its vertical axis, a disconnecting contact connected to each terminal of and carried by said circuit breaker and stationary disconnecting contacts coacting with the aforesaid disconnecting contacts in accordance with rotative movement of said circuit breaker.

2. Electrical switchgear comprising a movable portion including a circuit breaker having relatively movable contacts and a disconnecting contact connected to each terminal of said breaker and movable therewith, said movable portion rotatable with respect to a vertical axis, and stationary structure including disconnecting contacts connected to a plurality of circuits, the aforesaid movable and stationary disconnecting contacts coacting in accordance with rotative movement of said movable portion.

3. Electrical switchgear comprising an oil circuit breaker having relatively movable contacts mounted for bodily rotative movement about its vertical axis, a disconnecting contact connected to each terminal of said breaker and movable therewith, and stationary disconnecting contacts coacting with said movable disconnecting contacts in accordance with rotative movement of said circuit breaker, the aforesaid movable and stationary disconnecting contacts being immersed and operable within an insulating liquid separate from that in said circuit breaker.

4. Electrical switchgear comprising an oil circuit breaker having relatively movable contacts bodily rotatable with respect to its vertical axis, disconnecting contacts carried by and movable with said circuit breaker connected to the terminals thereof, stationary structure including casings containing oil in which said movable disconnecting contacts are immersed, and stationary disconnecting contacts mounted within said casings and immersed in said insulating liquid, engagement and disengagement of the coacting disconnecting contacts controlled by rotative movement of said circuit breaker.

5. Electrical switchgear comprising a movable portion including a circuit breaker and disconnecting contacts mounted for rotative movement about a vertical axis, said disconnecting contacts overhanging said circuit breaker and depending therefrom at opposite sides, and stationary structure including a plurality of circuits, oil-containing casings individually receiving said movable disconnecting contacts, and stationary disconnecting contacts connected to said circuits and transversely positioned with respect to said movable contacts within said casings, the disconnecting contacts isolating or connecting said circuit breaker with respect to said circuits in accordance with rotative movement of said movable portion.

6. Electrical switchgear comprising stationary structure including disconnecting contacts connected respectively to main and auxiliary busbars and a branch circuit, and a movable portion including a circuit breaker carrying disconnecting contacts coacting with the aforesaid disconnecting contacts for selectively connecting said branch circuit to the main or auxiliary busbar, said circuit breaker mounted for bodily rotative movement for connecting said branch circuit to either the main or auxiliary busbar or isolating said circuit breaker.

7. Electrical switchgear comprising a circuit breaker rotatable about its vertical axis, a pair of disconnecting contacts mounted at opposite sides of said breaker and movable therewith, stationary structure including a pair of casings containing oil arranged at opposite sides of said breaker. spaced stationary disconnecting contacts mounted within each of said casings, said movable disconnecting contacts extending within said casings and positioned transversely of and intermediate said stationary contacts, rotative movement of said circuit breaker being effective selectively to engage said disconnecting contacts or to isolate said circuit breaker.

8. In an electric bus and switch station, a switchgear unit comprising a circuit breaker mounted upon a turntable for bodily rotative movement, disconnecting contacts arranged at opposite sides of said circuit breaker and movable therewith, and stationary structure including main and auxiliary busbars arranged on opposite sides of said breaker, stationary disconnecting contacts connected to said busbars respectively, a casing containing oil in which one of said movable disconnecting contacts and said main and auxiliary busbar disconnecting contacts are immersed, a pair of disconnecting contacts connected to a feeder cable, a casing containing oil in which the other movable disconnecting contact and said feeder disconnecting contacts are immersed, rotative movement of said circuit breaker on said turntable being effective selectively to connect said feeder cable to said main or auxiliary busbar, or to isolate said circuit breaker, and a cover member movable with said circuit breaker and closing said oil-filled casings.

In witness whereof, I have hereunto set my hand.

DAVID REGINOLD DAVIES.